(12) United States Patent
Li et al.

(10) Patent No.: US 9,703,694 B2
(45) Date of Patent: Jul. 11, 2017

(54) TECHNIQUES FOR TESTING SOFTWARE

(71) Applicant: INTERNATIONAL BUSINESS MACHINES CORPORATION, Armonk, NY (US)

(72) Inventors: Yang L. Li, Shang Hai (CN); Ying N. Zhang, Shang Hai (CN); Guo Xin Zhao, Jilin Province (CN); Su Ning Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/263,704

(22) Filed: Apr. 28, 2014

(65) Prior Publication Data

US 2014/0325486 A1 Oct. 30, 2014

(30) Foreign Application Priority Data

Apr. 28, 2013 (CN) .......................... 2013 1 0154235

(51) Int. Cl.
  *G06F 9/44* (2006.01)
  *G06F 11/36* (2006.01)
  *G06F 11/34* (2006.01)
  *G06F 11/30* (2006.01)

(52) U.S. Cl.
  CPC ...... *G06F 11/3692* (2013.01); *G06F 11/3466* (2013.01); *G06F 11/3636* (2013.01); *G06F 11/3664* (2013.01); *G06F 11/3006* (2013.01)

(58) Field of Classification Search
  CPC ....................................... G06F 11/30–11/3696
  See application file for complete search history.

(56) References Cited

U.S. PATENT DOCUMENTS

| 8,230,267 | B2 | 7/2012 | Noller |
| 8,347,147 | B2 | 1/2013 | Adiyapatham |
| 8,578,340 | B1* | 11/2013 | Daudel ............... G06F 11/3636 717/128 |
| 8,924,935 | B1* | 12/2014 | Chopra ............... G06F 11/3664 717/120 |
| 8,966,447 | B2* | 2/2015 | Hoke et al. ................... 717/124 |
| 2006/0174170 | A1* | 8/2006 | Garland et al. ................. 714/57 |
| 2007/0192460 | A1* | 8/2007 | Choi et al. .................... 709/223 |

(Continued)

FOREIGN PATENT DOCUMENTS

CA  2772225 A1  9/2012

OTHER PUBLICATIONS

Delgado, Nelly et al., "A Taxonomy and Catalog of Runtime Software-Fault Monitoring Tools", 2004, pp. 859-872.*

(Continued)

*Primary Examiner* — Thuy Dao
*Assistant Examiner* — Christopher Franco
(74) *Attorney, Agent, or Firm* — Michael R. Long; Steven L. Bennett

(57) ABSTRACT

A technique for testing software includes monitoring whether a predefined event occurs in a software test instance. In response to occurrence of the predefined event, different types of snapshots of the software test instance are generated according to a property of the event. The snapshots are used to record a state of the software test instance when the predefined event occurs. The different types of snapshots are stored in information related to the predefined event.

14 Claims, 4 Drawing Sheets

(56) References Cited

U.S. PATENT DOCUMENTS

| | | | | |
|---|---|---|---|---|
| 2008/0313602 A1* | 12/2008 | Tillmann | ............ | G06F 11/3636 717/128 |
| 2011/0067008 A1* | 3/2011 | Srivastava | .......... | G06F 11/3466 717/128 |
| 2012/0159257 A1* | 6/2012 | Chen | ............................... | 714/37 |
| 2013/0047037 A1* | 2/2013 | Moyer | ................ | G06F 11/3656 714/38.1 |
| 2013/0061201 A1* | 3/2013 | Dayal | ................... | G06F 11/008 717/101 |
| 2013/0297603 A1* | 11/2013 | Brenker | .............. | G06F 11/3006 707/737 |
| 2014/0033179 A1* | 1/2014 | Gustus et al. | ................. | 717/127 |
| 2014/0040669 A1* | 2/2014 | Davis | .................. | G06F 11/3636 714/37 |
| 2014/0195446 A1* | 7/2014 | Yurach | ................ | G06F 11/3055 705/317 |
| 2014/0237453 A1* | 8/2014 | Hulick, Jr. | .................... | 717/127 |

OTHER PUBLICATIONS

Mahrenholz, Daniel et al., "Program Instrumentation for Debugging and Monitoring with AspectC++" 2002, pp. 1-8.*
Chen, Feng et al., "A Formal Monitoring-Based Framework for Software Development and Analysis", 2004, pp. 357-372.*
Nagarajan, Vijay et al., "ECMon: Exposing Cache Events for Monitoring", 2009, pp. 349-360.*
Sugaya, Midori et al., "Extensible Online Log Analysis System", 2011, pp. 79-84.*
Zhen-Dong, Li et al., "Bytecode-based Software Monitoring and Trusted Evolution Programming Framework", 2012, pp. 494-497.*

* cited by examiner

TECHNIQUES FOR TESTING SOFTWARE

This application claims priority to Chinese Patent Application No. 201310154235.1, entitled "A SNAPSHOT MECHANISM FOR SOFTWARE TESTING BASED ON EVENT DRIVEN TRIGGER IN CLOUD ENVIRONMENT," filed Apr. 28, 2013, the disclosure of which is hereby incorporated herein by reference in its entirety for all purposes.

BACKGROUND

The disclosure is generally directed to testing and, more particularly, to techniques for testing software.

After programming of software is completed, the software has to be tested in order to determine correctness, stability and the like of the software. During the test, a tester records various problems that have occurred, such as various exceptions due to inconsistency between test results and expected results as well as various serious or non-serious errors, etc., and reports these problems to a manager (e.g., a project manager) and a developer of the software, so that the manager can learn a progress and a state of the software test, and the developer can modify the software according to the problems so as to eliminate defects of the software.

Currently, the tester directly reports the problems found to the manager and the developer orally, or indirectly reports the problems found in a written form via a project management tool to the manager and the developer. However, in some test scenarios, for example, in complicated test scenarios such as a black box test, the tester's description of a problem may not be complete and accurate, so that the manager may not grasp the progress and the state of the test accurately, and meanwhile the developer cannot accurately understand the problem that arises and reproduce a scenario where the problem arises, which results in that the software cannot be modified perfectly to eliminate the defects therein.

BRIEF SUMMARY

A technique for testing software includes monitoring whether a predefined event occurs in a software test instance. In response to occurrence of the predefined event, different types of snapshots of the software test instance are generated according to a property of the event. The snapshots are used to record a state of the software test instance when the predefined event occurs. The different types of snapshots are stored in information related to the predefined event.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, an apparatus, and a computer program product for testing software.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

Figure 1:
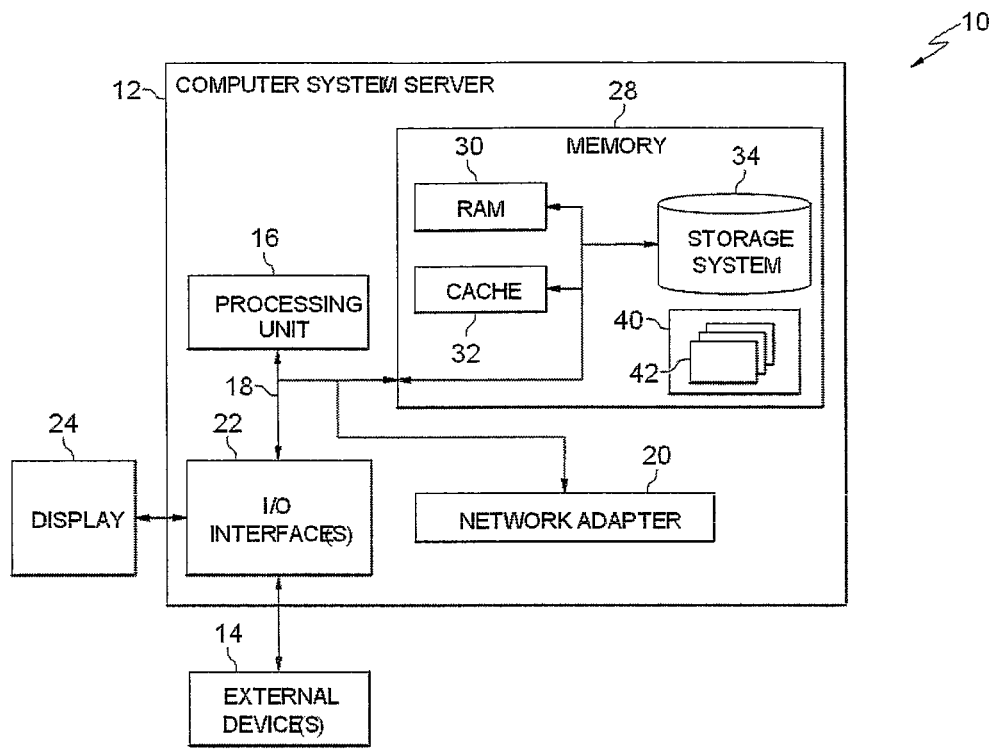
FIG. 1 is a block diagram showing an exemplary computer system/server that may implement embodiments of the present disclosure.

Referring now to FIG. 1, an exemplary computer system/server 12 that may implement embodiments of the present disclosure is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device that when programmed is a special-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of various embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and an apparatus for testing software according to embodiments of the present invention will be described with reference to the accompanying figures.

After programming of the software is completed, the software may be tested on a computer (physical or virtual machine) with an operating system installed thereon, so as to verify whether there is a defect in the software. If there is the defect in the software, various events, such as exceptions, errors, or other types of problems, may occur during the test. In the embodiments of the present invention, different types of snapshots of a software test instance may be generated in response to occurrence of the events, and information related to the events is displayed in a hierarchical manner on interactive interfaces provided for at least two of a manager, a developer and a tester of the software, so that the tester may accurately record and feed back the problems that occur during the software test, the developer may reproduce the software test instance when the events occur quickly from the snapshots so as to modify the software to eliminate a defect contained therein, and the manager may grasp a test progress in time, thereby improving efficiency of the software test. The interactive interfaces may be in the form of web pages, or in any other form selected as needed.

The manager of the software is responsible for organizing the test of the software. Particularly, the manager establishes a software test plan, such as a test schedule, etc., and designates a test case(s) that should be used during the test. The manager may input the software test plan via his interactive interface, and assign the test task to the tester and the developer.

The test case designated by the manager describes a test objective, a test scenario, test steps, an expected test result for the software test. In a case of automatic test, the test case may be analyzed by, for example, a parsing engine, so that a machine-readable instruction file is generated for execution by a computer. The method for the parsing engine to analyze the test case and generate the instruction file is commonly known in the art, thus a description thereof is omitted here. The generated instruction file may be deployed into the operating system, so that the software test is performed by execution of the instruction file. In a case of manual test, the instruction file may not be generated, and instead, the test steps are executed manually by the tester. Hereinafter, the embodiments of the present invention will be described by taking the case of automatic test as an example.

Figure 2:
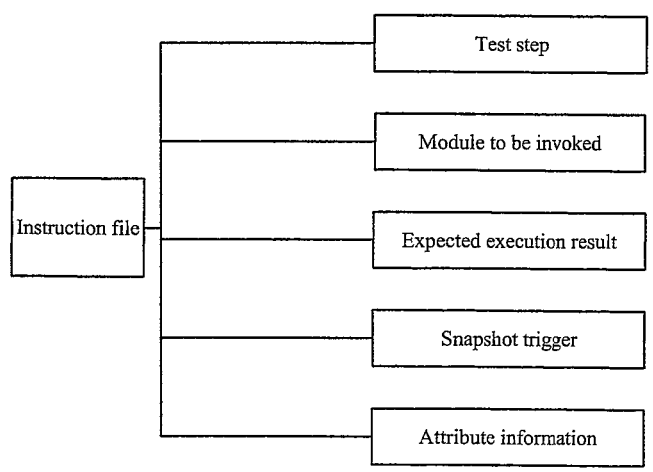
FIG. 2 schematically shows contents of an instruction file.

The instruction file may contain information required for the test. FIG. 2 schematically shows contents of the instruction file. As shown in FIG. 2, the instruction file may contain the test steps, i.e., the steps that should be followed when the software test is performed, which are determined according to the test case. Since the software may include a plurality of modules, the instruction file may further specify one or more modules of the software to be invoked during the software test, so as to test whether these modules are correct. Accordingly, the instruction file may specify an expected execution result (e.g. expected value) desired to be obtained for each of the modules. In addition, the instruction file may further include attribute information describing basic information of the instruction file, and the basic information may include, for example, a deployment environment, version information and so on of the instruction file.

As shown in FIG. 2, the instruction file may further define one or more snapshot triggers for triggering operations of generating one or more types of snapshots of the software test instance. Particularly, each snapshot trigger may define one triggering condition and an operation of generating a corresponding type of snapshots, so that when the triggering condition is met, the operation of generating the corresponding type of snapshots of the software test instance may be triggered by invoking the snapshot trigger. In the embodiments of the present invention, different snapshot triggers may be defined according to a property of the event occurring during the test. For example, by invoking different triggers, a plurality of snapshots of the software test instance may be generated for an event having a first property, and a single snapshot of the software test instance may be generated for an event having a second property. The property of the event may include severity of the event, a number of times that the event has occurred and a type of the event per se, or other properties of the event. For example, when the property of the event is the severity of the event, the severity of the event may be divided into three levels, i.e. a first severity level (e.g., severe), a second severity level (e.g., medium), and a third severity level (e.g., slight). Accordingly, two snapshot triggers may be defined in the instruction file. A first snapshot trigger uses the severity reaching the first severity level as the triggering condition, and an operation of generating a plurality of snapshots of the software test instance is triggered by invoking the first snapshot trigger for an event at the first severity level. A second snapshot trigger uses the severity reaching the second severity level as a triggering condition, and an operation of generating a single snapshot of the software test instance is triggered by invoking the second snapshot trigger for an event at the second severity level. For a slight event, a snapshot of the software test instance may not be generated, thus a snapshot trigger may not be defined. For example, the severity level of the event which has occurred may be determined according to whether the event affects realization of a function of the software or the modules and/or affects correctness of an execution result, where: when the event will not affect the realization of the function and the correctness of the execution result, the event may be determined to be at the third severity level; when the event will not affect the realization of the function but will affect the correctness of the execution result, the event may be determined to be at the second severity level; and when the event will render that the function can not be realized, the event may be determined to be at the first severity level. In other embodiments, the criterion for determine the severity level of the event is not limited to the above-described criterion, and may be any other criterion selected according to actual needs; in addition, the severity of the event may be divided into more or less levels, and corresponding types of snapshot triggers may be defined in the instruction file. The snapshot generating operations are not limited to the above two types, and may be of other types set according to actual needs, such as an operation of successively generating a plurality of snapshots, an operation of intermittently generating a plurality of snapshots, and so on.

The tester receives via his interactive interface the task assigned by the manager, and executes the test operation. Particularly, the tester may install the software to be tested in an operating system to thereby initialize a test instance. At this time, a snapshot of the test instance may be taken as a starting point of the software test. The snapshot taken at this time records a current state of the software test instance, e.g., the software test step currently performed, states or values of relevant variables/parameters in the software/modules, and the like. This snapshot may be in any form selected according to actual needs. For example, when the software test instance is created on a virtual machine to execute the software test, the snapshot may be a data file which may include information indicating the software test step executed when the snapshot is taken, a disk image file of the virtual machine running the software test instance at this time, and so on. In other situations, the snapshot may be in the form of a screenshot in which information indicating a current state of the software test instance is recorded. The snapshot may be stored in a snapshot pool. Since the method of generating the snapshot of the test instance is commonly known in the art, a description thereof is omitted to avoid repetition. As described below, the snapshot may be generated by a snapshot device.

After preparatory work is completed, the software test may begin. Hereinafter, a method for testing software according to the embodiment of the present invention will be described with reference to FIG. 3. As described above, the method will be described by taking the automatic test as an example.

Figure 3:
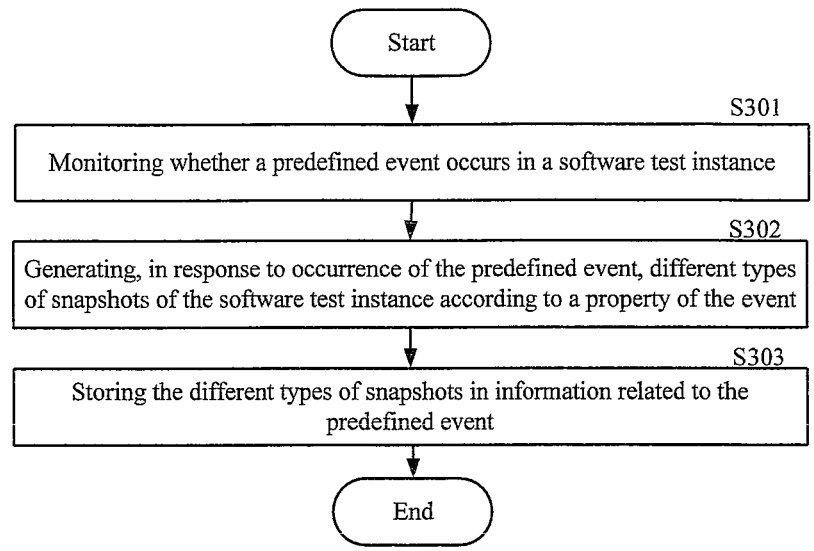
FIG. 3 is a flowchart showing a process for testing software according to an embodiment of the present disclosure.

As shown in FIG. 3, in step S301, it is monitored whether a predefined event occurs in the software test instance. As described above, the event may be an exception, an error, or other type of event, and hereinafter, the exception is taken as an example of the event. This monitoring operation may be executed by installing a monitoring plug-in in the tested software, and the monitor plug-in may be based on a programming language framework, so that the plug-in may be independent of modules of the software. Thus, the plug-in may be installed into the software at the beginning of the test, so as to carry out the monitoring operation when activated, without the need of modifying codes of the software itself, and the plug-in may be uninstalled after the software test is terminated.

As described above, the software may be tested by executing respective test steps given in the instruction file. During execution of the test steps, one or more modules designated in the instruction file will be invoked, and an execution result (actual execution result) will be outputted. The actual execution result may be analyzed to monitor whether the predefined event occurs in the software test instance.

Particularly, when a certain module of the software is invoked according to the test steps, the module will execute an operation designated by the test steps, and output an actual execution result. The actual execution result may be received and compared with an expected execution result designated for the module in the instruction file, so as to determine whether the two are consistent with each other, thereby monitoring an event that occurs in the software test instance. If the actual execution result is consistent with the expected execution result, the actual execution result is correct, i.e., no "exception" event occurs. On the contrary, if the actual execution result is inconsistent with the expected execution result, the actual execution result is wrong, i.e., an "exception" event occurs during the software test. Here, when the actual execution result and the expected execution result are the same, they may be determined as being consistent with each other, otherwise they may be determined as being inconsistent with each other. Alternatively, when a deviation of the actual execution result from the expected execution result is less than a predetermined acceptable range, the actual execution result and the expected execution result may be determined as being consistent with each other, otherwise they may be determined as being inconsistent with each other.

When it is determined that the "exception" event occurs, the module of the software associated with the event and a class and/or a function therein may be recorded for later use. For example, if the "exception" event occurs when a certain module is invoked, the event may be recorded in the form of a message, which may be in a format shown in Table 1 below:

TABLE 1

| Event Name | Function Name | Class Name | Input Value | Output value | ... | Result |
|---|---|---|---|---|---|---|
| Exception 1 | F1 | A | X1 | Y1 | ... | Inconsistent |

In Table 1, the "event name" indicates a name of the event that occurs when the module is invoked, the "function name" indicates the function of the module associated with the event, the "class name" indicates the class of the module associated with the event, the "input value" indicates an input value for the module when the module is invoked, the "output value" indicates an output value obtained by invoking the module, and the "result" indicates a result of a comparison between the output value and an expected execution result. By such a message, the "exception" event which has occurred may be associated with respective components (module/class/function) of the software.

Then, it may be determined whether the event which has occurred has been recorded in an event library in advance. Particularly, the event may be matched to respective events stored in advance in the event library, so as to determine whether the event is an event predefined in the event library. The event library is, for example, a database established by the tester in advance, and stores various types of events that may occur during the software test as its entries. For example, in a situation where the event is "exception", the "exception" may be matched to various "exceptions" stored in advance in the event library, so as to determine whether the "exception" is a predefined "exception".

If there is no entry matching the event that has occurred in the event library, the event that has occurred is not the predefined event, in which case the event may be ignored, or may be recorded in a candidate event library and thereafter selectively added into the above event library for use in a future test. As described in detail later, the event may be selectively added into the event library by a self-learning process.

On the other hand, if there is an entry matching the event that has occurred in the event library, it may be determined that the event that has occurred is the predefined event. Next, in step S302, in response to the occurrence of the predefined event, different types of snapshots of the software test instance are generated according to a property of the event. The snapshots are used to record a state of the software test instance when the predefined event occurs.

As described above, in the embodiment of the present invention, the property of the event may include the severity of the event, the number of times that the event occurs and the type of the event per se, or other properties of the event. For example, when the property of the event is the severity of the event, the severity of the event may be divided into three levels, i.e., a first severity level (e.g., severe), a second severity level (e.g., medium), and a third severity level (e.g., slight). The criterion for dividing the severity levels may be set flexibly according to actual needs. When it is determined that the predefined event occurs, the severity level of the event is determined according to the criterion, and then different types of snapshots of the software test instance may be generated by invoking a corresponding snapshot trigger in the instruction file according to the severity level. Particularly, for an event at the first severity level, a first type of snapshot generating operation may be executed; for example, a plurality of snapshots of the software test instance, such as a plurality of snapshots of the software test instance at a plurality of time points before and after a time point when the event occurs, may be generated. For an event at the second severity level, a second type of snapshot generating operation may be executed; for example, a single snapshot of the software test instance may be generated. For an event at the third severity level, a snapshot operation may not be executed. Here, the snapshot taken in response to the occurrence of the predefined event may be in any form selected according to actual needs. For example, when the software test instance runs on a virtual machine to execute the software test, the snapshot may be a data file which may include information indicating the software test step executed when the predefined event occurs, and a disk image file of the virtual machine when the predefined event occurs. In other situations, the snapshot may be in the form of a screenshot in which information indicating a current state of the software test instance when the predefined event occurs is recorded. In addition, the severity levels are not limited to the above three types, and the executed snapshot generating operation are not limited to the above two types.

In this way, by generation of the snapshot of the software test instance when the predefined event (such as an exception or an error) occurs, the state of the software test instance when the predefined event occurs, such as the software test step which is being executed, states or values of respective functions/variables in the software, and the like, can be recorded timely and accurately, so that the developer can quickly restore the scenario at the time when the event occurs (i.e., the state of the software test instance) according to the snapshot, to thereby locate and solve a defect in the software. In addition, by generating different types of snapshots according to the property of the event that occurs, the generated snapshots can reflect a background where the event occurs more fully. For example, when a severe event occurs during the software test process, an entire process of the occurrence of the event can be learned more clearly by analyzing a plurality of snapshots of the software test instance at a plurality of time points before and after a time point when the event occurs, thereby locating and solving a defect in the software accurately.

Next, in step S303, the different types of snapshots are stored in information related to the predefined event.

After the predefined event occurs, information related to the predefined event may be stored so as to be presented to the tester, the developer, and the manager where appropriate. To this end, the different types of snapshots may be stored in the information related to the predefined event. In addition to the snapshots, other information selected as needed (for example, information which will be described later with reference to FIGS. 4-6), such as information indicating that the event occurred, a content of the event, a module and codes of the software associated with the event, and so on, may be further stored in the information related to the predefined event. The information related to the predefined event may be stored in various ways. For example, the information may be stored in the snapshot pool in association with the snapshots, or may be stored in a separate database (e.g., an event library), and the information may be stored by using a data file in any appropriate format.

In the embodiment of the present invention, the information related to the predefined event may also be displayed on interactive interfaces for at least two of the developer, the tester, and the manager of the software in a hierarchical manner.

Particularly, as described above, the interactive interfaces may be provided for the developer, the tester, and the manager of the software. When it is detected in step S301 that an event, such as an exception, an error or the like, occurs, the information related to the predefined event may be displayed on the interactive interfaces for at least two of the developer, the tester, and the manager of the software in a hierarchical manner. That is, different information related to the predefined event may be displayed on the interactive interfaces for the developer, the tester, and the manager of the software according to different roles of the three parties, so as to report the event to the developer, the tester, and the manager of the software in a hierarchical manner. In addition, with the proceeding of the software test, a progress of the test may be visually presented to the manager via the interactive interface, so that the manager can easily grasp the progress of the test.

Figure 4:
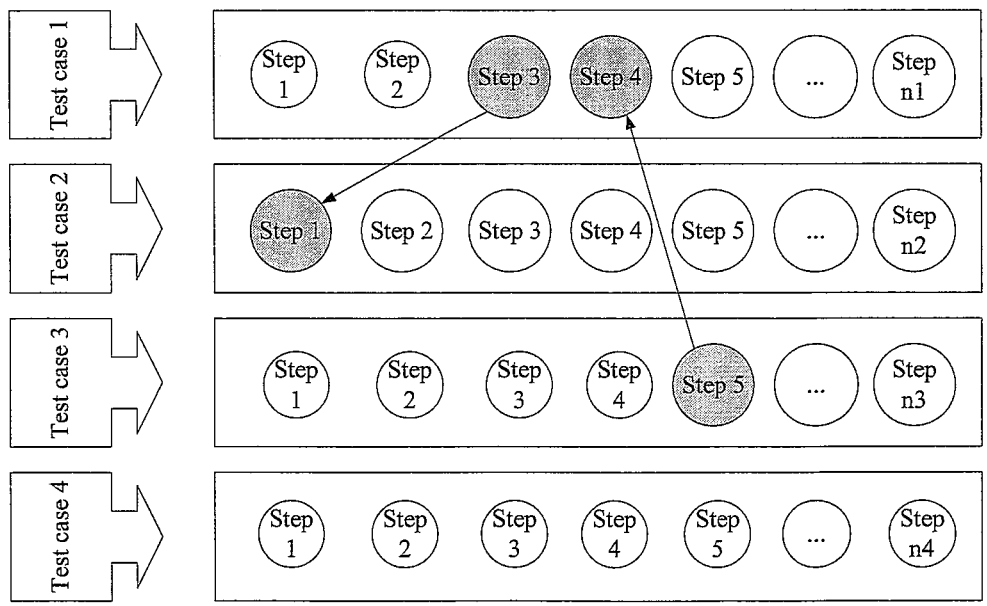
FIG. 4 shows an example of a manager's interactive interface (i.e., a manager's view).

FIG. 4 shows an example of a manager's interactive interface. The manager's interactive interface may display progresses of respective test cases designated by the manager, in addition to being used for inputting a software test plan and assigning a content of a test task (not shown). As shown in FIG. 4, a plurality of (4, in FIG. 4) test cases designated by the manager and test steps of each of the test cases may be displayed on the manager's interactive interface (in FIG. 4, test steps 1-n1, 1-n2, 1-n3, and 1-n4 are shown respectively for the test cases 1-4). The test cases and their operating steps may be displayed in a visual manner. In the example shown in FIG. 4, test steps for each test case are indicated by circles. Progresses of the tests may further be displayed visually on the manager's interactive interface in various ways. In the example shown in FIG. 4, the test steps that have been completed may be indicated by small circles, while the test steps that have not been completed may be indicated by large circles. Furthermore, colors of the circles may be used to indicate whether a problem occurs when a test step is executed. For example, when the event described above occurs during execution of a certain test step, a circle corresponding to the test step may be changed from white to gray (for example, step 3 of the test case 1 and step 5 of the test case 3) to convey this situation to the manager. In addition, when completion of a certain test step of a test case is a premise for execution of a certain test step of another test case, and if the test step as the premise fails to be completed due to occurrence of the event, in addition to changing a circle denoting the test step to gray, a circle denoting the corresponding test step of the another test case may further be changed to gray. In the example of FIG. 4, since completion of the test step 3 of the test case 1 is a premise for execution of the test step 1 of the test case 2, completion of the test step 5 of the test case 3 is a premise for execution of the test step 4 of the test case 1, and the test step 3 of the test case 1 and the test step 5 of the test case 3 fail to be completed due to occurrence of the event described above, a circle to which the test step 1 of the test case 2 corresponds and a circle to which the test step 4 of the test case 1 corresponds appear gray. Through the interactive interface shown in FIG. 4, the manager can easily learn the test case that has been completed (test case 4), the test cases (test cases 1-3) in which problems occur, and specific test steps in which the problems occurs, and thereby grasp the overall software test progress. It should be noted that the interactive interface shown in FIG. 4 is merely exemplary, and any other form of interface may be adopted as long as the interface can clearly present the above-described information to the manager. For example, other graphics, in addition to the circles, may be adopted to denote the test steps, and different colors may be used to indicate whether the test steps are completed and whether a problem occurs.

Figure 5:
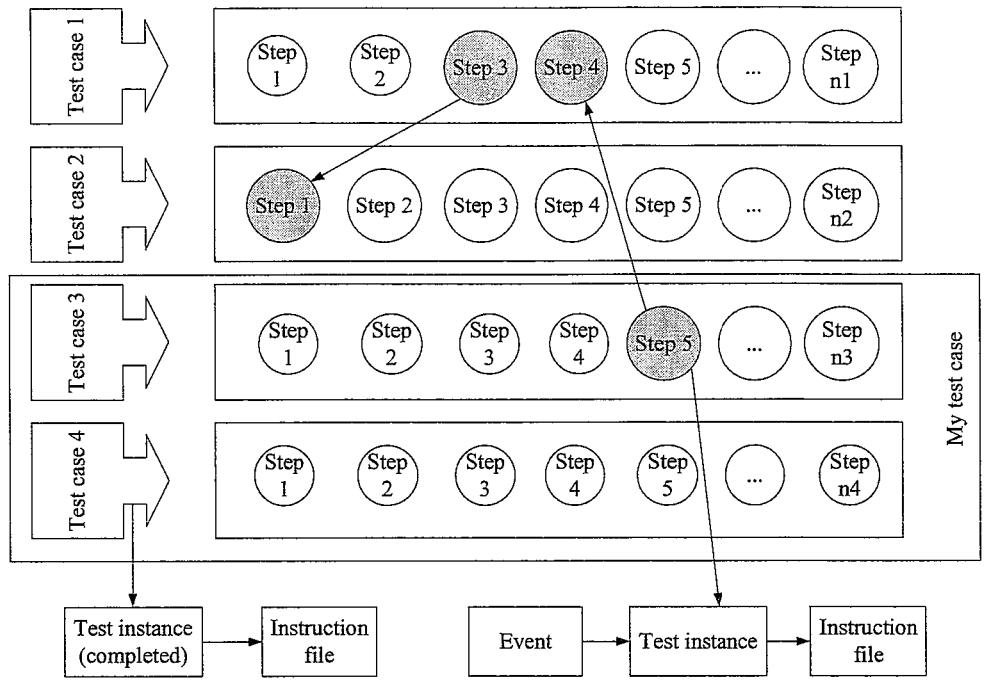
FIG. 5 shows an example of a tester's interactive interface (i.e., a tester's view).

FIG. 5 shows an example of a tester's interactive interface. As shown in FIG. 5, more content related to the test may be displayed on the interactive interface, in addition to the content shown in FIG. 4. Particularly, test cases which the tester is in charge of ("My test cases"), test instances to which the test cases correspond ("Test instances") and their states ("Completed"), events which have occurred during the test conducted based on the test instances ("Events"), and so on, may further be displayed on the tester's interactive interface. In addition, an instruction file to which each of the test cases corresponds ("Instruction file") may also be displayed on the interactive interface, so that the tester can modify the instruction file if necessary. For example, the tester may modify the instruction file by a self-learning process described later. By displaying the information, the tester can learn a progress of each test case which he is in charge of, and thereby can arrange his work reasonably so as to avoid wasting time on test cases that are unexecutable.

Figure 6:
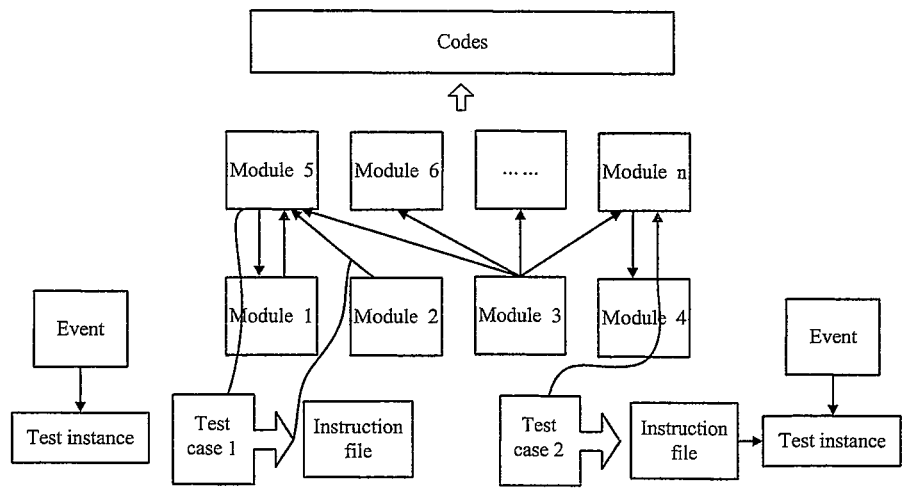
FIG. 6 shows an example of a developer's interactive interface (i.e., a developer's view).

FIG. 6 shows an example of a developer's interactive interface. As shown in FIG. 6, an event (exception or error) which has occurred during the software test, a test case in which the event has occurred, and an instruction file and a test instance to which the test case corresponds may be displayed on the interactive interface. In addition, a module of the software associated with the event and codes of the module may also be displayed on the developer's interactive interface. As described above with reference to Table 1, information related to the event is recorded when the event occurs, the module of the software associated with the event may be determined and displayed by analyzing the information, and codes of the module are displayed correspondingly. That is, when the event occurs, the module of the software associated with the event and the codes of the module may be automatically displayed on the developer's interactive interface, so that the developer can easily locate the defective module and the codes thereof, and thereby improve efficiency of his work.

The self-learning process according to an embodiment of the present disclosure is described below. As described above, when it is determined in step S301 that the event that has occurred is not the predefined event, the event may be recorded in the candidate event library. Then, after the test is completed, for example, an event in the candidate event library may be evaluated, so that the event may be selectively added to the event library for use in a future test, thereby conducting a self-learning of the event library. The event may be evaluated according to a predetermined criterion, so as to determine whether it is necessary to add the event to the event library. The criterion may be any suitable criterion selected in advance based on actual needs. For example, the criterion may be whether the event will affect realization of a function of the software, whether the event will make the software unable to run, or the like. For example, if the event will affect the realization of the function of the software, the event may be added to the event library, otherwise the event may be ignored. Thus, in a future test, when the event occurs, a corresponding snapshot generating operation may be executed to record a state of a software test instance at this time.

In addition, the instruction file may be modified according to the non-predefined event that has occurred during the test. As known in the art, if the instruction file is not written properly, for example, if the test steps in the instruction file are set unreasonably, this may lead to occurrence of an unexpected event (or problem), such as an exception or an error during the software test. The non-predefined event that has occurred may be analyzed to determine a cause of the event and the instruction file may be modified. Such modification may be performed by the tester or the developer through, for example, an extracting device described below.

Figure 7:
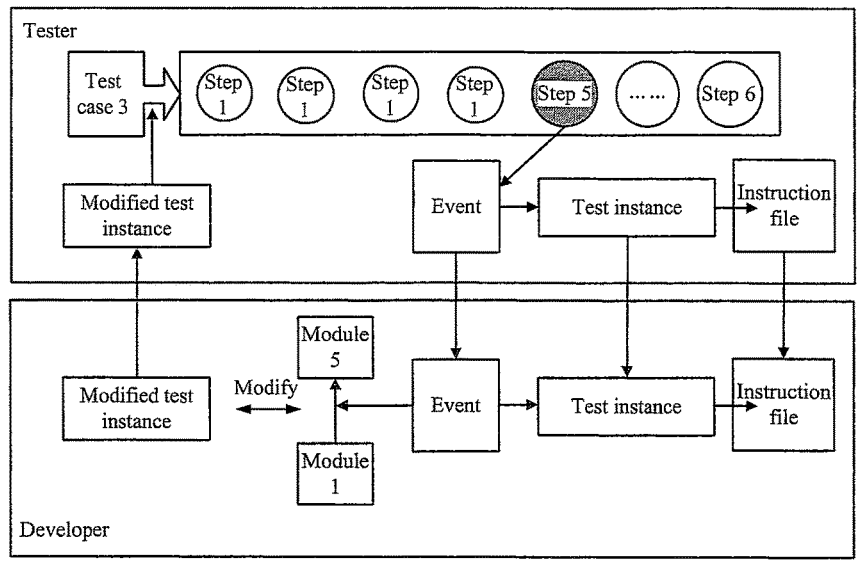
FIG. 7 schematically shows workflows of a tester and a developer when a certain event occurs during a software test.

In the embodiment of the present invention, the tester and the developer can cooperate more closely during the software test. FIG. 7 schematically shows workflows of the tester and the developer when an event such as an exception or an error occurs during the software test.

As shown in FIG. 7, it is assumed that an "exception" event occurs when the software is tested by using the test case 3 and the test step 5 is executed. The tester sends information related to the "exception" event and a snapshot of the test instance when the event occurs to the developer via the tester's interactive interface. As described above, the tester may modify the instruction file for the test case if necessary. The developer receives, via his interactive interface, the information and the snapshot sent by the tester, locates and modifies a defective module(s) of the software (e.g., modules 1 and 5) based on the information and the snapshot, and then returns a modified test instance to the tester, so that the tester can re-execute the software test which is based on the test case 3 according to the test instance to confirm whether the developer has removed the defect in the software, and reports a test result to the manager. In addition, the developer may also modify the instruction file for the test case if necessary, and provide the modified instruction file to the tester for the software test. In this manner, through such a working cycle, the workflow of the tester and that of the developer can be connected seamlessly, thereby the software test is more efficient.

According to embodiments of the present disclosure, a manager can control the progress of the software test and adjust the software test plan more conveniently. As described above, the manager may establish the software test plan via his interactive interface, and assign the test task to the tester so as to start the software test. When an event, such as the exception or the error, occurs, the event may be promptly notified to the manager via, for example, a monitoring plug-in embedded in the software, so that the manager can learn of the problem immediately and thereby arrange for the developer to deal with the problem and/or adjust the test plan. Such a bidirectional interactive process further improves efficiency of the software test.

In this way, the developer, the tester, and the manager of the software are closely associated with each other by the disclosed processes. Particularly, since the snapshot of the software test instance is generated when the predefined event occurs, and the information related to the predefined event is presented on views for at least two of the developer, the tester, and the manager in a hierarchical manner, the tester can monitor and feed back the test result accurately, the developer can locate and fix a defect existing in the software easily, and the manager can grasp the test progress in time, so that a test flow of "testing—occurrence of the event—generating the snapshot—locating and fixing the problem—testing" is accelerated and the test efficiency is improved. In various embodiments, the snapshot pool may also be established so that the snapshot generated at the time when the test instance is initialized and the snapshot generated in the subsequent software test process or the information associated with the predefined event including the snapshot may be stored in the snapshot pool. Thus, the related snapshot or the information related to the predefined event may be fetched from the snapshot pool when necessary, so as to restore the corresponding test instance. In addition, a test instance library may also be established, so as to store therein test instances with different progresses. For example, when a software test executed by a certain tester based on a first test case passes, the test instance at this time may be stored in the test instance library. Thus, when another tester uses a second test case which is based on the first test case to test the software, the tester may extract the test instance for which the first test case has been completed from the test instance library and continue to test the software on the basis of this test instance, without the need of re-executing the software test which is based on the first test case, thereby test may be accelerated.

Hereinafter, an apparatus for testing software according to an embodiment of the present disclosure is described with reference to FIG. 8. The apparatus may execute the process described above.

Figure 8:
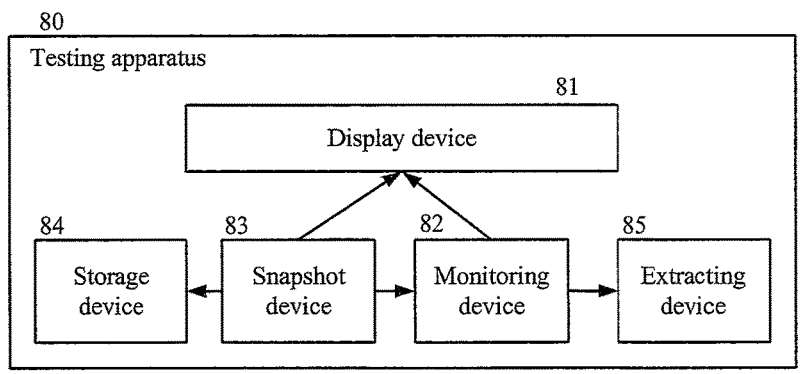
FIG. 8 is a block diagram showing an apparatus for testing software according to an embodiment of the present disclosure.

As shown in FIG. 8, the apparatus 80 for testing software according to the embodiment of the present disclosure may comprise a display device 81, a monitoring device 82, a snapshot device 83, and a storage device 84. Preferably, the apparatus 80 may further comprise an extracting device 85.

The display device 81 may present the interactive interfaces described above to a manager, a tester, and a developer of the software, respectively, so that the three parties can cooperate with each other via the interactive interfaces.

The monitoring device 82 monitors whether a predefined event occurs in a software test instance. As described above, the event may be an exception, an error, or other type of event. As described above, the monitoring device 81 may be implemented as a monitoring plug-in which is based on a programming language framework, so that the plug-in may be independent of modules of the software and may be installed in the software when the software is started so as to execute the above monitoring operation when activated, or may be implemented as hardware independent of the software and monitoring running of the software.

Figure 9:
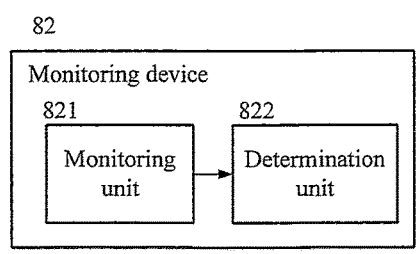
FIG. 9 is a block diagram showing a detailed structure of a monitoring device shown in FIG. 8.

FIG. 9 illustrates a detailed structure of the monitoring device 82. As shown in FIG. 9, the monitoring device 82 includes a monitoring unit 821 and a determination unit 822.

The monitoring unit 821 monitors the event that occurs in the software test instance, such as the exception, the error or the like.

As described above, the software is tested by executing respective test steps provided in the instruction file. During execution of the test steps, a module designated in the instruction file is invoked and an actual execution result is output. The monitoring unit 821 may receive the actual execution result obtained through the module and compare it with an expected execution result designated for the module in the instruction file, so as to determine whether the two are consistent. If the actual execution result is consistent with the expected execution result, the monitoring unit 821 may determine that an event did not occur. On the contrary, if the actual execution result is inconsistent with the expected execution result, the monitoring unit 821 may determine that an event has occurred during the software test. As described above, it may be determined that the actual execution result and the expected execution are consistent when they are the same, or when a deviation of the actual execution result from the expected execution result is less than a predetermined acceptable range.

The determination unit 822 determines whether the detected event has been recorded in advance in an event library and determines whether the event is a predefined event in response to determining that the event has been recorded in advance in the event library. Particularly, the determination unit 821 may match the event with respective events stored in advance in the event library to determine whether the event is an event predefined in the event library. If there is no entry matching the event which has occurred in the event library, the determination unit 822 may determine that the event is not a predefined event. In this situation, the event may be ignored, or may be recorded in a candidate event library and then be selectively added to the event library for use in a future test. On the other hand, if there is an entry matching the event which has occurred in the event library the determination unit 822 may determine the event as the predefined event.

In response to the occurrence of a predefined event, the snapshot device 83 generates different types of snapshots of the software test instance according to a property of the event. The snapshots are used to record a state of the software test instance at the time when the predefined event occurs.

As described above, in various embodiments the property of the event may include severity of the event, a number of times that the event occurs and a type of the event per se, or other properties of the event. Accordingly, the snapshot device 83 may generate a plurality of snapshots of the software test instance for an event having a first property, and may generate a single snapshot of the software test instance for an event having a second property. For example, when the property of the event is the severity of the event, the severity of the event may be divided into three levels, i.e. a first severity level (e.g., severe), a second severity level (e.g., medium) and a third severity level (e.g., slight). A criterion for dividing the severity level may be set flexibly according to actual needs. When it is determined that the predefined event has occurred, the monitoring device 82 may determine the severity level of the event according to the criterion. Then, the snapshot device 83 may generate different types of snapshots of the software test instance by invoking corresponding snapshot triggers in the instruction file according to the severity level. Particularly, for an event at the first severity level, the snapshot device 83 may perform a first type of snapshot generating operation, for example, generating a plurality of snapshots of the software test instance (e.g., a plurality of snapshots of the software test instance at a plurality of time points before and after a time point when the event occurs). For an event at the second severity level, the snapshot device 83 may perform a second type of snapshot generating operation, for example, generating a single snapshot of the software test instance. For an event at the third severity level, the snapshot device 83 may not perform a snapshot generating operation. As described above, the snapshots may be in any form selected according to actual needs, and a detailed description thereof is omitted here. In addition, the severity levels are not limited to the above three types, and the snapshot generating operations performed are not limited to the above two types.

In this way, by generation of the snapshot of the software test instance by using the snapshot device when the predefined event (such as the exception or the error) occurs, the state of the software test instance when the event occurs can be recorded, so that the developer may restore a scenario when the event occurs quickly according to the snapshot to thereby locate and solve a defect in the software. In addition, as described above, by generation of different types of snapshots according to the property of the event which has occurred, the generated snapshots can reflect a background where the event occurs fully, so that the developer can locate and solve the defect existing in the software more accurately.

After the different types of snapshots are generated, the storage device 84 may store the different types of snapshots in information related to the predefined event. As described above, in addition to the snapshots, the storage device 84 may also store in the information related to the predefined event other information selected as needed (e.g. the information described above with reference to FIGS. 4-6), such as information indicating that the event occurs, a content of the event, a module of the software associated with the event and codes thereof, and so on. The storage device 84 may also store the information related to the predefined event in various ways. For example, the storage device 84 may store the information in the snapshot pool in association with the snapshots, or store the information in a separate database (e.g., the event library), and the storage device 84 may store the information by using a data file in any appropriate format.

In addition, after the predefined event occurs, the display device 81 may also display the information related to the predefined event on interactive interfaces (views) for at least two of the manager, the tester, and the developer in a hierarchical manner. In this way, the manager, the tester, and the developer may learn problems that occur in the software test and acquire information which they need and then perform different operations according to their roles. The interactive interfaces displayed by the display device 81 and the contents displayed on the interactive interfaces are the same as those described above and, as such, detailed descriptions thereof are omitted here.

The extracting device 85 may perform a self-learning process. Particularly, when the monitoring device 82 determines that the event that has occurred is not the predefined event, it may record the event in the candidate event library. After the test is complete, the tester may evaluate the event in the candidate event library. The extracting device 85 may selectively extract the event from the candidate event library according to a result of the evaluation performed by the tester, so as to add it into the event library for use in a future test. Thus, in the future test, the event becomes a predefined event, and when the event occurs, a corresponding snapshot generating operation may be performed to record a state of a software test instance.

The extracting device 85 may further be used to modify the instruction file based on the non-predefined event which occurs during the test. The extracting device 85 may perform this modification according to an instruction of the tester or the developer in the manner described above, and a detailed description thereof Is omitted here.

With the apparatus for testing software according to the present disclosure, when an event, such as an exception or an error, occurs in the software test instance, different types of snapshots of the software test instance may be generated according to the property of the problem and the current state of the software test instance may be displayed on views for the manager, the tester and the developer, so that the tester can monitor and feed back the test result correctly, the developer can reproduce a scenario where the event occurs quickly based on the snapshots to thereby locate and fix a defect existing in the software accurately, and the manager can grasp the test progress in time, and adjust the software test plan according to influence of the event on the test process so as to optimize the test flow. Thereby, the test flow of "testing—occurrence of the event—generating the snapshot—locating and fixing the problem—testing" is accelerated, and the test efficiency is improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of testing software, comprising:
   monitoring, by a computer system, whether a predefined event occurs in a software test instance, wherein the monitoring is performed by a plug-in that is installed in the software test instance and is independent of modules of the software test instance;
   in response to occurrence of the predefined event during execution of the software test instance, generating, by the computer system, a plurality of snapshots of the software test instance when the event is at a first severity level and a single snapshot when the event is at a second severity level that is lower than the first severity level, wherein the snapshots are used to record a state of the software test instance when the predefined event occurs; and
   storing, by the computer system, the snapshots in association with the predefined event;
   wherein the monitoring, by a computer system, whether a predefined event occurs in a software test instance further comprises:
      monitoring for a first event occurring in the software test instance;
      determining whether the first event has been recorded in advance in an event library;
      determining the first event is the predefined event, in response to determining that the first event has been recorded in advance in the event library; and
      in response to determining that the first event has not been recorded in advance in the event library, determining the first event is a non-predefined event and selectively adding the non-predefined event to the event library.

2. The method of claim 1, further comprising:
   displaying, by the computer system, the information related to the predefined event in a hierarchical manner on interactive interfaces for at least two of a manager, a developer, and a tester of the software.

3. The method of claim 1, further comprising:
   modifying an instruction file for testing the software according to the non-predefined event.

4. The method of claim 1, wherein the event is an exception or an error that occurs in the software test instance.

5. The method of claim 1, wherein the plurality of snapshots are generated at a plurality of time points before and after a time point when the event occurs.

6. An apparatus for testing software, comprising:
   a computer system including one or more processors coupled to a memory, wherein the processors are configured to implement:
      a monitoring device configured to monitor whether a predefined event occurs in a software test instance, wherein the monitoring is performed by a plug-in that is installed in the software test instance and is independent of modules of the software test instance; and
      a snapshot device configured to, generate, in response to occurrence of the predefined event during execution of the software test instance, a plurality of snapshots of the software test instance when the event is at a first severity level and a single snapshot when the event is at a second severity level that is lower than the first severity level, wherein the snapshots record a state of the software test instance when the predefined event occurs; and the memory is configured to implement a storage device configured to store the snapshots in association with the predefined event;
   wherein the monitoring device comprises:
      a monitoring unit configured to monitor for a first event occurring in the software test instance; and
      a determination unit configured to determine whether the first event has been recorded in advance in an event library and determine the first event is the predefined event in response to determining that the first event has been recorded in advance in the event library, wherein the determination unit determines the first event is a non-predefined event in response to determining that the first event is not recorded in advance in the event library;
   and wherein the apparatus further comprises an extracting device configured to, in response to determining that the first event has not been recorded in advance in the event library, determine the first event is a non-predefined event, and selectively add the non-predefined event to the event library.

7. The apparatus of claim 6, further comprising:
   a display device configured to display the information related to the predefined event in a hierarchical manner on interactive interfaces for at least two of a manager, a developer, and a tester of the software.

8. The apparatus of claim 6, wherein the extracting device is further configured to modify an instruction file for testing the software according to the non-predefined event.

9. The apparatus of claim 6, wherein the event is an exception or an error that occurs in the software test instance.

10. The apparatus of claim 6, wherein the plurality of snapshots are generated at a plurality of time points before and after a time point when the first event occurs.

11. A computer program product, comprising:
    a computer readable storage memory; and program code embodied on the computer readable storage memory, wherein the program code, when executed by a processor of a computer system, configures the computer system to:

monitor whether a predefined event occurs in a software test instance, wherein the monitoring is performed by a plug-in that is installed in the software test instance and is independent of modules of the software test instance;

in response to occurrence of the predefined event during execution of the software test instance, generate a plurality of snapshots of the software test instance when the event is at a first severity level and a single snapshot when the event is at a second severity level that is lower than the first severity level, wherein the snapshots are used to record a state of the software test instance when the predefined event occurs;

store the snapshots in association with the predefined event;

monitor for a first event occurring in the software test instance;

determine whether the first event has been recorded in advance in an event library;

determine the first event as the predefined event, in response to determining that the first event has been recorded in advance in the event library; and in response to determining that the first event has not been recorded in advance in the event library, determine the first event is a non-predefined event and selectively add the non-predefined event to the event library.

12. The computer program product of claim 11, wherein the program code, when executed by the processor, further configures the computer system to:

display the information related to the predefined event in a hierarchical manner on interactive interfaces for at least two of a manager, a developer and a tester of the software.

13. The computer program product of claim 11, wherein the program code, when executed by the processor, further configures the computer system to:

modify an instruction file for testing the software according to the non-predefined event.

14. The computer program product of claim 11, wherein the event is an exception or an error that occurs in the software test instance.

* * * * *